United States Patent [19]

Chu et al.

[11] Patent Number: 4,770,862

[45] Date of Patent: Sep. 13, 1988

[54] REMOVAL OF HYDROGEN SULFIDE FROM SUPERCRITICAL CARBON DIOXIDE

[75] Inventors: Humbert H. Chu; Warren V. Bush, both of Houston, Tex.

[73] Assignee: Shell Oil Company, Houston, Tex.

[21] Appl. No.: 53,650

[22] Filed: May 26, 1987

[51] Int. Cl.$^4$ ............... C01B 17/16; C01B 31/20
[52] U.S. Cl. .................... 423/229; 423/228
[58] Field of Search ..................... 423/228, 229

[56] References Cited

U.S. PATENT DOCUMENTS 3,989,811 11/1976 Hill .................................. 423/229
4,240,922 12/1980 Sartori et al. ...................... 423/228

FOREIGN PATENT DOCUMENTS

WO86/05474 9/1986 PCT Int'l Appl. ............... 423/229

Primary Examiner—Robert L. Stoll
Assistant Examiner—Adriana L. Mui

[57] ABSTRACT

$H_2S$ is removed from substantially supercritical $CO_2$ by contact with a sorbent solution comprising (a) a tertiary amine; (b) particular physical co-sorbent; and (c) 3–10% w water.

23 Claims, No Drawings

REMOVAL OF HYDROGEN SULFIDE FROM SUPERCRITICAL CARBON DIOXIDE

BACKGROUND OF THE INVENTION

1. Field of the Invention

The present invention is directed to a process for the removal of hydrogen sulfide from supercritical carbon dioxide ($CO_2$).

2. Description of the State of the Art

Supercritical (fluid) carbon dioxide ($CO_2$) is different from conventional hydrocarbon or by-product liquids and gases in that it is a dense fluid which is compressible like a gas but unlike a gas is pumpable like a liquid. It is desirable to pipeline $CO_2$ as a supercritical single phase fluid, for ultimate use, e.g., as an injection fluid in secondary and tertiary oil recovery, and to have a sweet (essentially $H_2S$-free) fluid to transport and utilize as an injection fluid.

Generally $CO_2$ produced from wells is depressurized, purified in the gaseous state, and repressurized at the field location for pipelining in its supercritical state. This requires (1) sizable on-site equipment for depressurizing and repressurizing the $CO_2$, solvent handling and (2) high energy demands. In the case of supercritical $CO_2$, most of the conventional sorbents used to remove $H_2S$ selectively from gases such as natural gas, for example, aqueous methyldiethanolamine or other amines in aqueous solution, or physical solvents such as Selexol, or mixed solvents such as Sulfinol, are not useful because (1) the partial pressure of $CO_2$ is so high that solvent selectivity is impaired, or (2) the solvent and the supercritical $CO_2$ do not form two phases—an essential condition for any form of solvent treatment. Moreover, supercritical $CO_2$ is a very good solvent, and undesirably dissolves many potential treating solvents such as these.

U.S. Pat. No. 4,545,965 describes a process for the purification of gases, e.g., natural gas, containing $H_2S$ in the presence of minor amounts of $CO_2$ using a solution of a tertiary amine and a variety of selective solvents, including sulfolane, N-methylpyrrolidone, glycol (ethers), amines and certain heterocyclic-nitrogen compounds. Water is an undesirable ingredient, which may be "tolerated" in limited amounts, such as less than 2%. Indeed, the presence of water in Examples 7 and 8 of U.S. Pat. No. 4,545,965 increased the amount of $CO_2$ sorbed over that in the absence of water in Example 1. Also, applicant has found that the sulfolane co-sorbent of Examples 1 and 5 through 8 of the patent and many other co-sorbents of the patent are not effective co-sorbents for substantially supercritical $CO_2$ because of the unique properties and requirements of sorbents for substantially supercritical $CO_2$ as compared to the requirements for sorbents for conventional hydrobcarbon or by-product liquids and gases, e.g., natural gas, coal gasification products and the like.

Suprisingly, it has been found that certain solvent systems are good solvent systems for removing $H_2S$ from supercritical $CO_2$, thus avoiding the problems of depressurization and repressurization and high energy demands while handling the unique properties of supercritical $CO_2$ by being a much better solvent for $H_2S$ than supercritical $CO_2$ is for the solvent.

SUMMARY OF THE INVENTION

The present invention is directed to a process for the removal of hydrogen sulfide ($H_2S$) from mixtures with substantially supercritical (fluid) carbon dioxide ($CO_2$) which comprises contacting the supercritical (fluid) carbon dioxide with a sorbent solution comprising (a) a tertiary amine; (b) a physical solvent with low viscosity and low mutual miscibiity with substantially supercritical (fluid) carbon dioxide; and (c) from about 3% to about 10% by weight water based on the total weight of sorbent solution.

Use of the above process to sweeten substantially supercritical $CO_2$ avoids the problems of the prior art, including equipment and energy costs associated with depressurization and repressurization and higher solvent handling, by allowing dense, substantially supercritical $CO_2$ to be sweetened in its substantially supercritical form at decreased solvent rates without undesirable levels of cosorption of $CO_2$.

Carbon dioxide is commonly produced from subterranean reservoirs at above its critical point of 87.9° F. and 1071 psia. For transmission, the temperature and pressure of $CO_2$ are maintained or raised to at least its critical point. The supercritical $CO_2$ to be purified can contain up to a few percent of impurities in addition to minor amounts of $H_2S$. These additional impurities include water, hydrocarbons, such as methane, corrosion inhibitors added during production and the like.

$CO_2$ is conveniently sweetened in substantially its supercritical form, that is near, at or above the critical point, for example, from about 87.9° F. to about 150° F. Preferably, it is sweetened at from about 100° F. to about 130° F., and at pressures from about 1071 psia to about 1500 psia, and preferably from about 1100 psia to about 1300 psia. Higher temperatures up to about 150° F. and pressures up to about 2400 psia can be used if desired.

The tertiary amine (a) can take the form of an optionally substituted aliphatic, cycloaliphatic, aryl or (aryl) heterocyclic tertiary amine, which is conventionally known in the art as a sorbent for removal of hydrogen sulfide from gases.

In one embodiment of the invention, the tertiary amine is a lower aliphatic amine containing from 1 to 10 carbon atoms and, especially is a mono- or poly-lower alkanol amine containing 1 to 3 carbon atoms in each alkyl group, for example, dimethylethanolamine, methyldiethanolamine, methyldipropanolamine, methyldiisopropanolamine, ethyldiethanolamine, ethyldipropanolamine, ethyldiisopropanolamine, triethanolamine, dipropylethanolamine, propyldiethanolamine, isopropyldiethanolamine, dipropylethanolamine, diisopropylethanolamine, propyldipropanolamine, propyldiisopropanolamine, isopropyldipropanolamine, isopropyldiisopropanolamine and the like. Preferably, the tertiary amine is triethanolamine and, especially, methyldiethanolamine.

The physical co-solvent (b) is one which has a relatively low viscosity and relatively low miscibility with supercritical fluid $CO_2$. By relatively low viscosity is meant a viscosity to allow adequate contact, phase separation and overall process manipulation, for example, a viscosity of about 1 centistoke or less at 120° F. By relatively low miscibility with supercritical (fluid) $CO_2$ is meant having a solubility of supercritical $CO_2$ in the mixture of less than about 1 scf $CO_2$/lb solvent at 1200 psig and 120° F. Examples of such physical co-solvents are lower alkane diols (glycols) and polyols, or lower alkyl ethers thereof in which lower means containing from 1 to 6 carbon atoms in each alkyl group, including ethylene glycol, diethylene glycol, triethylene glycol, glycerol, sorbitol and the like. Preferably, the co-solvent is glycerol, and especially, triethylene glycol.

The third component (c) is water present in the composition in an amount of from about 3% w to about 10% w.

The ratio of ingredients (a), (b) and (c) in the sorbent solution of the invention are varied independently, within the ranges specified below. For example, the ratios can be: (a) from about 15% w to about 85% w of tertiary amine; (c) from about 3% w to about 10% w of water; and the balance being co-solvent (b). The percentages are by weight of ingredient based on the total weight of sorbent solution. In one embodiment of the invention, the ratio of ingredients is (a) from about 35% w to about 75% w of tertiary amine; (c) from about 3.5% w to about 8% w water; and the balance being co-solvent (b). Preferably, the ratio of ingredients is (a) from about 45% w to about 65% w of tertiary amine; (c) from about 4% w to about 6.5% w of water, and the balance being co-solvent. In another embodiment of the invention, the sorbent solution comprises from about 5% w to about 6% w of water. All compositions of the three components must meet the following general requirements: (1) the sorbent solution must have low enough viscosity to achieve effective mixing; (2) the sorbent solution must form an immiscible phase with supercritical $CO_2$.

The supercritical (fluid) $CO_2$ is conveniently treated, e.g., at field locations by (countercurrently) contacting the supercritical (fluid) $CO_2$ at or above its critical point with the sorbent solution of the invention. The loaded sorbent solution is removed from the contacting zone and subjected to desorption or stripping or the like to unload the $H_2S$ providing lean sorbent solution for recycle to the contacting zone. The water content of the lean sorbent should be either controlled via control of the stripping operation or by addition of water to meet the requirements of the sorbent solution of the invention. Possible variations in the equipment and processing are well known to those familiar with the art of gas purification.

ILLUSTRATIVE EMBODIMENTS

The present invention is illustrated by the following embodiments, which should not be regarded as limiting the invention in any way.

EMBODIMENT 1

A gas mixture comprising supercritical 96.3% w $CO_2$ containing 3% w $H_2O$ and 7000 ppmm $H_2S$ was contacted in a vapor-liquid equilibrium cell contacting zone at 1200 psig and 120° F. with a sorbent comprising 55% w methyldiethanolamine, 3–10% w water and balance triethylene glycol. The results are set forth in Table 1 below in which α is the equilibrium selectivity of the sorbent. $K_{CO2}$ is the equilibrium constant for supercritical $CO_2$ and $K_{H2S}$ is the equilibrium constant for $H_2S$ in which $K = Y/X$ in which Y is the composition of $CO_2$ or $H_2S$, respectively, in the supercritical fluid phase and X is the composition of $CO_2$ or $H_2S$, respectively, in the sorbent liquid phase.

TABLE 1

| EFFECT OF WATER SORBENT CONTENT ON EQUILIBRIUM SELECTIVITY ($\alpha = K_{CO2}/K_{H2S}$) | |
|---|---|
| % w water | Equilibrium Selectivity α |
| 3 | 5.4 |

TABLE 1-continued

| EFFECT OF WATER SORBENT CONTENT ON EQUILIBRIUM SELECTIVITY ($\alpha = K_{CO2}/K_{H2S}$) | |
|---|---|
| % w water | Equilibrium Selectivity α |
| 4 | 6.7 |
| 5 | 7 |
| 10 | 3.9 |

The results illustrate that the presence of minor amounts of water affect the ratio of absorption of $H_2S$ and $CO_2$ at equilibrium, and that at about 5% w water, the least $CO_2$ is removed.

EMBODIMENT 2

The experiment of Embodiment 1 was repeated except that the water content of the sorbent was maintained at 5% w and the amount of methyldiethanolamine (MDEA) was varied as set forth in Table 2.

TABLE 2

| EFFECT OF MDEA CONTENT ON EQUILIBRIUM SELECTIVITY ($\alpha = K_{CO2}/K_{H2S}$) | |
|---|---|
| % w MDEA | Equilibrium Selectivity α |
| 0 | 3 |
| 14 | 4.9 |
| 35 | 5.6 |
| 55 | 7.2 |
| 75 | 6.2 |

The results illustrate that the amount of tertiary amine affects the ratio of absorption of $H_2S$ at equilibrium and $CO_2$ and that at about 55% w of MDEA, the least $CO_2$ is removed.

EMBODIMENT 3

A gas stream comprising 99.6% v $CO_2$, and 4300 ppmm of $H_2S$ was contacted at 1200 psig and 120° F. in a 30-tray absorber column with a sorbent solution comprising 52% w methyldiethanolamine, 43% w triethylene glycol and 5% w water. The loaded solvent was desorbed to expel $H_2S$ and other acid gases by steam stripping in a separate regenerator column. The amount of $H_2S$ separated was 91% while the amount of $CO_2$ separated was 13%. One hundred percent approach to $H_2S$ equilibrium was reached at top absorber tray, basis the $H_2S$ content of the stripped solvent.

| Feed Gas | |
|---|---|
| Feed gas rate, Mscfd | 91 |
| $H_2S$ content, ppmm | 43 |
| $CO_2$ content, % v | 99.6 |
| Temperature, °F. | 127 |
| Lean Solvent Feed | |
| Solvent rate, gpm | 1.1 |
| $H_2S$ loading, ppmw | 241 |
| $CO_2$ loading, ppmw | 30 |
| Treated $CO_2$ | |
| $H_2S$ content, ppmm | 467 |
| % $CO_2$ cosorption | 13 |
| % $H_2S$ removal | 91 |
| Process Conditions | |
| Absorber trays | 30 |
| L/V, gpm/MMscfd | 12 |
| Reboiler steam rate, lbs/gal | 0.5 |

Results of this experiment demonstrate that the sorbent solution of the invention is useful for removal of $H_2S$ from supercritical $CO_2$.

What is claimed is:

1. A process for the removal of hydrogen sulfide impurities from a mixture with substantially supercritical carbon dioxide which process comprises contacting substantially supercritical carbon dioxide mixture with a sorbent solution comprising (a) a tertiary amine; (b) a physical co-sorbent with a low viscosity of 1 centistoke or less at 120° F. and low mutual miscibility with substantially supercritical carbon dioxide of less than 1 scf $CO_2$/lb solvent at 1200 psig and 120° F.; and (c) from about 3% to about 10% by weight of water based on the total weight of solvent solution and recovering substantially supercritical carbon dioxide reduced in hydrogen sulfide impurities.

2. A process according to claim 1 wherein the tertiary amine is an aliphatic amine.

3. A process according to claim 2 wherein the tertiary amine is a mono- or poly-lower alkanol amine containing from 1 to 10 carbon atoms.

4. A process according to claim 3 wherein the tertiary amine is triethanolamine or methyldiethanolamine.

5. A process according to claim 4 wherein the tertiary amine is methyldiethanolamine.

6. A process according to claim 1 wherein the physical co-sorbent (b) is lower alkane diol or polyol containing from 1 to 6 carbon atoms in each alkyl group.

7. A process according to claim 6 wherein the co-sorbent (b) is glycerol, ethylene glycol, diethylene glycol or triethylene glycol.

8. A process according to claim 7 wherein the co-sorbent (b) is glycerol or triethylene glycol.

9. A process according to claim 8 wherein the co-sorbent (b) is triethylene glycol.

10. A process according to claim 1 wherein the sorbent solution comprises from about 3.5% w to about 8% w of water.

11. A process according to claim 10 wherein the sorbent solution comprises from about 4% w to about 6.5% w of water.

12. A process according to claim 11 wherein the sorbent solution comprises from about 5% w to about 6% w of water.

13. A process according to claim 1 wherein the sorbent solution comprises from about 15% w to about 85% w of tertiary amine.

14. A process according to claim 13 wherein the sorbent solution comprises from about 35% w to about 75% w tertiary amine.

15. A process according to claim 14 wherein the sorbent solution comprises from about 45% w to about 65% w of tertiary amine.

16. A process according to claim 1 wherein the sorbent solution (a) is a mono- or poly-lower alkanol amine, and (b) is a lower alkane diol or polyol containing from 1 to 6 carbon atoms in each alkyl group.

17. A process according to claim 16 wherein in the sorbent solution (a) is methyldiethanolamine and (b) is triethylene glycol.

18. A process according to claim 16 wherein (a) is about 15% w to about 85% w of the sorbent solution.

19. A process according to claim 18 wherein (a) is about 35% w to about 75% w of the sorbent solution.

20. A process according to claim 19 wherein (a) is about 45% w to about 65% w of the sorbent solution.

21. A process according to claim 19 wherein (c) is about 3.5% w to about 8% w of the sorbent solution.

22. A process according to claim 20 wherein (c) is about 4% w to about 6.5% w of the sorbent solution.

23. A process according to claim 22 wherein (c) is about 5% w to about 6% w of the sorbent solution.

* * * * *